US009736066B2

United States Patent
Song et al.

(10) Patent No.: US 9,736,066 B2
(45) Date of Patent: Aug. 15, 2017

(54) METHOD, APPARATUS AND SYSTEM FOR ESTABLISHING OPTICAL BYPASS

(71) Applicant: Huawei Technologies Co., Ltd., Shenzhen (CN)

(72) Inventors: Xuefei Song, Shenzhen (CN); Yinben Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/981,287

(22) Filed: Dec. 28, 2015

(65) Prior Publication Data

US 2016/0112306 A1 Apr. 21, 2016

Related U.S. Application Data

(63) Continuation of application No. PCT/CN2013/078403, filed on Jun. 28, 2013.

(51) Int. Cl.
*H04L 12/64* (2006.01)
*H04Q 11/00* (2006.01)
(Continued)

(52) U.S. Cl.
CPC .......... *H04L 45/50* (2013.01); *H04L 12/6418* (2013.01); *H04Q 11/0066* (2013.01);
(Continued)

(58) Field of Classification Search
None
See application file for complete search history.

(56) References Cited

U.S. PATENT DOCUMENTS

| 2009/0268739 A1 | 10/2009 | Dunbar et al. |
| 2009/0323522 A1 | 12/2009 | Deguchi |
| 2011/0033183 A1 | 2/2011 | Doverspike et al. |

FOREIGN PATENT DOCUMENTS

| CN | 101030939 A | 9/2007 |
| CN | 101616054 A | 12/2009 |

(Continued)

OTHER PUBLICATIONS

Yang et al., "Multi-stratum Resource Integration for OpenFlow-Based Data Center Interconnect [Invited]," IEEE/OSA Journal of Optical Communications and Networking, vol. 5, Issue 10, pp. A240-A248, Institute of Electrical and Electronics Engineers, New York, New York (Oct. 23, 2013).

(Continued)

*Primary Examiner* — Darren E Wolf
(74) *Attorney, Agent, or Firm* — Leydig, Voit & Mayer, Ltd.

(57) ABSTRACT

Provided are a method, an apparatus and a system for establishing an optical bypass. The method includes: a route controller sending an optical bypass establishment request carrying information about an ingress node, an egress node and a required bandwidth to an optical transmission controller; and setting a second flow forwarding entry corresponding to the optical bypass for the ingress node and the egress node and sending the set second flow forwarding entry to the ingress node and the egress node when receiving an establishment success notification sent by the optical transmission controller, the establishment success notification being used for indicating that the optical transmission controller has allocated the optical bypass according to the optical bypass establishment request, set a first flow forwarding entry corresponding the bypass for each optical transmission device in the optical bypass, and sent the set first flow forwarding entry to a corresponding optical transmission device.

19 Claims, 4 Drawing Sheets

(51) Int. Cl.
*H04L 12/723* (2013.01)
*H04L 12/751* (2013.01)
*H04L 12/707* (2013.01)
*H04L 12/721* (2013.01)

(52) U.S. Cl.
CPC .............. *H04L 45/02* (2013.01); *H04L 45/22* (2013.01); *H04L 45/62* (2013.01); *H04Q 2011/0073* (2013.01); *H04Q 2011/0077* (2013.01); *H04Q 2011/0086* (2013.01)

(56) References Cited

FOREIGN PATENT DOCUMENTS

| | | | |
|---|---|---|---|
| CN | 101795478 | A | 8/2010 |
| CN | 101860769 | A | 10/2010 |
| CN | 102045236 | A | 5/2011 |
| CN | 102186124 | A | 9/2011 |
| CN | 102273146 | A | 12/2011 |
| CN | 102761478 | A | 10/2012 |
| EP | 2239956 | A1 | 10/2010 |
| EP | 2466809 | A1 | 6/2012 |

OTHER PUBLICATIONS

Gunkel et al., "Advanced Multilayer Resilience Scheme with Optical Restoration for IP-over-DWDM Core Networks," 4$^{th}$ International Congress on Ultra Modern Telecommunications and Control Systems and Workshops (ICUMT), St. Petersburg, Florida, pp. 657-662, Institute of Electrical and Electronics Engineers, New York, New York (Oct. 3-5, 2012).

Zhong et al., "Networking with ByPass Flow Technology," ZTE Technology Journal, vol. 18, Issue 6, pp. 56-59 (Dec. 2012).

_US 9,736,066 B2_

METHOD, APPARATUS AND SYSTEM FOR ESTABLISHING OPTICAL BYPASS

CROSS-REFERENCE TO RELATED APPLICATIONS

This application is a continuation of International Patent Application No. PCT/CN2013/078403, filed on Jun. 28, 2013, which is hereby incorporated by reference in its entirety.

TECHNICAL FIELD

The disclosure relates to the field of Internet technology, and particularly to a method, an apparatus and a system for establishing an optical bypass.

BACKGROUND

As the development of network technology, user requirement on bandwidth is growing rapidly. Currently, in order to satisfy the growing requirement on bandwidth, a network architecture combining an optical transmission device and a routing device is generally adopted in establishing a core network. Such network architecture includes an optical transmission layer and a routing transmission layer, and several inter-layer links are provided between the optical transmission layer and the routing transmission layer.

If bandwidth usage of a certain link segment in a Label Switched Paths (LSP) established by the routing transmission layer can not satisfy bandwidth requirement of the LSP, an optical bypass of the LSP may be established based on an ingress node, an egress node and bandwidth requirement of this link segment, so as to satisfy the bandwidth requirement. The optical bypass is a label switched path which is connected between the ingress node and the egress node described above by an optical transmission device. The optical bypass may be established as follows: an optical transmission controller, once receiving an optical bypass establishment request sent by a routing controller, allocates one optical bypass to a corresponding LSP, and feeds back information related to the optical bypass to the routing controller, the routing controller then notifies the ingress node of the optical bypass to send a Generalized Multiprotocol Label Switching (GMPLS) User-Network Interface (UNI) message to the egress node, with the GMPLS UNI message carrying path information of the optical bypass, the ingress node, the egress node and each optical transmission device in the optical bypass forward the GMPLS UNI message based on the path information, and establish corresponding stream forward entries, therefore, the optical bypass of the LSP described above is established.

The inventors found at least the following conventional problems in implementing the disclosure.

In the conventional process of establishing the optical bypass of the Label Switched path described above, it is required to allocate a control channel in the link for transmitting the GMPLS UNI message, which occupies a large amount of bandwidth resource and results in resource waste.

SUMMARY

In order to improve utilization of network resources, a method, an apparatus and a system for establishing an optical bypass are provided by embodiments herein.

In a first aspect, a method for establishing an optical bypass is provided, the method includes:

sending, by a routing controller, an optical bypass establishment request to an optical transmission controller, where the optical bypass establishment request carries information about an ingress node, an egress node and a required bandwidth; and when an establishment success notification sent by the optical transmission controller is received, setting, by the routing controller, a second stream forward entry corresponding to the optical bypass for the ingress node and the egress node, and sending, by the routing controller, the set second stream forward entry to the ingress node and the egress node, where the establishment success notification is configured to indicate that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device.

In a first possible implementation of the first aspect, the setting, by the routing controller, a second stream forward entry corresponding to the optical bypass for the ingress node and the egress node includes:

setting, by the routing controller, a matching entry of the second stream forward entry corresponding to the optical bypass for the ingress node based on a matching entry of an existing stream forward entry of a target LSP in the ingress node, and setting, by the routing controller, an action entry of the second stream forward entry corresponding to the optical bypass for the ingress node based on a port through which the ingress node is connected to the optical transmission device in the optical bypass; and setting, by the routing controller, a matching entry of the second stream forward entry corresponding to the optical bypass for the egress node based on a matching entry of an existing stream forward entry of the target LSP in the egress node and a port through which the egress node is connected to the optical transmission device in the optical bypass, and setting, by the routing controller, an action entry of the second stream forward entry corresponding to the optical bypass for the egress node based on an action entry of the existing stream forward entry of the target LSP in the egress node.

In a second possible implementation of the first aspect, before sending the optical bypass establishment request to the optical transmission controller by the routing controller, the method further includes:

determining, by the routing controller, a link in a target LSP for which an optical bypass needs to be established and the required bandwidth based on bandwidth occupation of each link in the target LSP; and determining, by the routing controller, the ingress node and the egress node of the link.

In a third possible implementation of the first aspect, before sending the optical bypass establishment request to the optical transmission controller by the routing controller, the method further includes:

triggering, by the routing controller, a discovery process for an inter-layer link between a routing transmission layer and an optical transmission layer to make the optical transmission controller acquire inter-layer link information; and receiving, by the routing controller, the inter-layer link information sent by the optical transmission controller.

In a fourth possible implementation of the first aspect in conjunction with the third possible implementation of the first aspect, the triggering, by the routing controller, a discovery process for an inter-layer link between a routing transmission layer and an optical transmission layer to make the optical transmission controller acquire inter-layer link information, and receiving, by the routing controller, the inter-layer link information sent by the optical transmission controller includes:

sending, by the routing controller, a first message to a first routing device under jurisdiction of the routing controller based on device information of the first routing device, where the first message carries a first port identification of a first port of the first routing device and a first device identification of the first routing device; so that the first routing device sends a second message through the first port, where the second message carries the first port identification and the first device identification; so that a first optical transmission device receiving the second message sends a third message to the optical transmission controller, where the third message carries a second port identification of a second port through which the first optical transmission device receives the second message, a second device identification of the first optical transmission device, the first port identification and the first device identification; so that the optical transmission controller stores an inter-layer link correspondence among the first device identification, the first port identification, the second device identification and the second port identification, and sends a fourth message to the routing controller, where the fourth message carries the first device identification, the first port identification, the second device identification and the second port identification;

receiving, by the routing controller, the fourth message sent by the optical transmission controller; and storing, by the routing controller, the inter-layer link correspondence among the first device identification, the first port identification, the second device identification and the second port identification.

In a second aspect, a method for establishing an optical bypass is provided, the method includes:

receiving, by an optical transmission controller, an optical bypass establishment request sent by a routing controller;

allocating, by the optical transmission controller, an optical bypass based on the optical bypass establishment request; and setting, by the optical transmission controller, a first stream forward entry corresponding to the optical bypass for each optical transmission device in the optical bypass and sending the set first stream forward entry to the corresponding optical transmission device; and sending, by the optical transmission controller, an establishment success notification to the routing controller.

In a first possible implementation of the second aspect, the setting, by the optical transmission controller, a first stream forward entry corresponding to the optical bypass for each optical transmission device in the optical bypass includes:

setting, by the optical transmission controller, a matching entry of the first stream forward entry corresponding to the optical bypass for an optical transmission device in the optical bypass based on a port through which the optical transmission device in the optical bypass is connected to a last hop device of the optical transmission device in the optical bypass, and setting, by the optical transmission controller, an action entry of the first stream forward entry corresponding to the optical bypass for the optical transmission device in the optical bypass based on a port through which the optical transmission device in the optical bypass is connected to a next hop device of the optical transmission device in the optical bypass.

In a second possible implementation of the second aspect, before receiving, by the optical transmission controller, the optical bypass establishment request sent by the routing controller, the method further includes:

acquiring, by the optical transmission controller, inter-layer link information by a discovery process for an inter-layer link between a routing transmission layer and an optical transmission layer that is triggered by the routing controller; and sending, by the optical transmission controller, the inter-layer link information to the routing controller.

In a third possible implementation of the second aspect in conjunction with the second possible implementation of the second aspect, the acquiring, by the optical transmission controller, inter-layer link information by a discovery process for an inter-layer link between a routing transmission layer and an optical transmission layer that is triggered by the routing controller, and sending, by the optical transmission controller, the inter-layer link information to the routing controller includes:

receiving, by the optical transmission controller, a third message sent by a first optical transmission device under jurisdiction of the optical transmission controller, where the third message is sent to the optical transmission controller by the first optical transmission device receiving a second message after the routing controller sends a first message to a first routing device under jurisdiction of the routing controller based on device information of the first routing device to make the first routing device sends the second message through a first port, where the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification; and storing, by the optical transmission controller, an inter-layer link correspondence among the first device identification, the first port identification, the second device identification and the second port identification, and sending, by the optical transmission controller, a fourth message to the routing controller, where the fourth message carries the first device identification, the first port identification, the second device identification and the second port identification; so that the routing controller stores the inter-layer link correspondence among the first device identification, the first port identification, the second device identification and the second port identification.

In a third aspect, a routing controller is provided, the routing controller includes:

a sending module, configured to send an optical bypass establishment request to an optical transmission controller, where the optical bypass establishment request carries information about an ingress node, an egress node and a required bandwidth; and a setting module, configured to, when an establishment success notification sent by the optical transmission controller is received, set a second stream forward entry corresponding to an optical bypass for the ingress node and the egress node, and send the set second stream forward entry to the ingress node and the egress node, where the establishment success notification is configured to indicate that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device.

In a first possible implementation of the third aspect, the setting module is configured to:

set a matching entry of the second stream forward entry corresponding to the optical bypass for the ingress node based on a matching entry of an existing stream forward entry of a target LSP in the ingress node, and set an action entry of the second stream forward entry corresponding to the optical bypass for the ingress node based on a port through which the ingress node is connected to the optical transmission device in the optical bypass; and set a matching entry of the second stream forward entry corresponding to the optical bypass for the egress node based on a matching entry of an existing stream forward entry of the target LSP in the egress node and a port through which the egress node is connected to the optical transmission device in the optical bypass, and set an action entry of the second stream forward entry corresponding to the optical bypass for the egress node based on an action entry of the existing stream forward entry of the target LSP in the egress node.

In a second possible implementation of the third aspect, the routing controller further includes:

a determining module, configured to determine a link in a target LSP for which an optical bypass needs to be established and the required bandwidth based on bandwidth occupation of each link in the target LSP, and determine the ingress node and the egress node of the link, before the optical bypass establishment request is sent to the optical transmission controller.

In a third possible implementation of the third aspect, the routing controller further includes a discovery module configured to:

trigger a discovery process for an inter-layer link between a routing transmission layer and an optical transmission layer to make the optical transmission controller acquire inter-layer link information, and receive the inter-layer link information sent by the optical transmission controller, before the optical bypass establishment request is sent to the optical transmission controller.

In a fourth possible implementation of the third aspect in conjunction with the third possible implementation of the third aspect, the discovery module is configured to:

send a first message to a first routing device under jurisdiction of the routing controller based on device information of the first routing device, where the first message carries a first port identification of a first port of the first routing device and a first device identification of the first routing device; so that the first routing device sends a second message through the first port, where the second message carries the first port identification and the first device identification; so that a first optical transmission device receiving the second message sends a third message to the optical transmission, where the third message carries a second port identification of a second port through which the first optical transmission device receives the second message, a second device identification of the first optical transmission device, the first port identification and the first device identification; so that the optical transmission controller stores an inter-layer link correspondence among the first device identification, the first port identification, the second device identification and the second port identification, and sends a fourth message to the routing controller, where the fourth message carries the first device identification, the first port identification, the second device identification and the second port identification;

receive the fourth message sent by the optical transmission controller; and store the inter-layer link correspondence among the first device identification, the first port identification, the second device identification and the second port identification.

In a fourth aspect, an optical transmission controller is provided, including:

a receiving module, configured to receive an optical bypass establishment request sent by a routing controller;

an allocation module, configured to allocate an optical bypass based on the optical bypass establishment request; and a sending module, configured to set a first stream forward entry corresponding to the optical bypass for each optical transmission device in the optical bypass, and send the set first stream forward entry to the corresponding optical transmission device; and send an establishment success notification to the routing controller.

In a first possible implementation of the fourth aspect, the sending module is configured to:

set a matching entry of the first stream forward entry corresponding to the optical bypass for an optical transmission device in the optical bypass based on a port through which the optical transmission device in the optical bypass is connected to a last hop device of the optical transmission device in the optical bypass, and set an action entry of the first stream forward entry corresponding to the optical bypass for the optical transmission device in the optical bypass based on a port through which the optical transmission device in the optical bypass is connected to a next hop device of the optical transmission device in the optical bypass.

In a second possible implementation of the fourth aspect, the optical transmission controller further includes a discovery module configured to acquire inter-layer link information by a discovery process for an inter-layer link between a routing transmission layer and an optical transmission layer that is triggered by the routing controller, and send the inter-layer link information to the routing controller, before the optical bypass establishment request sent by the routing controller is received.

In a third possible implementation of the fourth aspect in conjunction with the second possible implementation of the fourth aspect, the discovery module is configured to:

receive a third message sent by a first optical transmission device under jurisdiction of the optical transmission controller, where the third message is sent to the optical transmission controller by the first optical transmission device receiving a second message after the routing controller sends a first message to a first routing device under jurisdiction of the routing controller based on device information of the first routing device to make the first routing device sends the second message through a first port, where the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification; and store an inter-layer link correspondence among the first device identification, the first port identification, the second device identification and the second port identification, and send a fourth message to the routing controller, where the fourth message carries the first device identification, the first port identification, the second device identification and the second port identification; so that the routing controller stores the inter-layer link correspondence among the first device identification, the first port identification, the second device identification and the second port identification.

In a fifth aspect, a system for establishing an optical bypass is provided, the system includes a routing controller, an optical transmission controller, a routing device and an optical device, where the routing controller is configured to send an optical bypass establishment request to the optical transmission controller, where the optical bypass establishment request carries information about an ingress node, an egress node and a required bandwidth; and when receiving an establishment success notification sent by the optical transmission controller, set a second stream forward entry corresponding to the optical bypass for the ingress node and the egress node, and send the set second stream forward entry to the ingress node and the egress node; and the optical transmission controller is configured to receive the optical bypass establishment request sent by the routing controller; allocate the optical bypass based on the optical bypass establishment request; set a first stream forward entry corresponding to the optical bypass for each optical transmission device in the optical bypass, and send the set first stream forward entry to the corresponding optical transmission device; and send the establishment success notification to the routing controller.

There are the following advantages of the technical solutions provided by embodiments.

In the embodiments, a routing controller sends an optical bypass establishment request to an optical transmission controller, with the optical bypass establishment request carrying the information about an ingress node, an egress node and a required bandwidth. When receiving an establishment success notification sent by the optical transmission controller, the routing controller sets a second stream forward entry corresponding to the optical bypass for the ingress node and the egress node, and sends the set second stream forward entry to the ingress node and the egress node. The establishment success notification is configured to indicate that the optical transmission controller has allocated an optical bypass based on the optical bypass establishment request, set a first stream forward entry corresponding to the optical bypass for each optical transmission device in the optical bypass, and sent the set first stream forward entry to the corresponding optical transmission device. In this way, in establishing the optical bypass, it does not need to allocate a control channel in the routing link for transmitting the GMPLS UNI message when notifying of the stream forward entry of the optical bypass, thus, utilization of the network resources can be improved.

BRIEF DESCRIPTION OF THE DRAWINGS

In order to more clearly illustrate the technical solutions of the embodiments herein, accompanying drawings used in the description of the embodiments are introduced below simply. Obviously, the accompanying drawings in the following description are just some embodiments. Other accompanying drawings may also be obtained by those skilled in the art based on these accompanying drawings without any creative work.

DETAILED DESCRIPTION

In order to make the objects, the technical solutions and the advantages of the disclosure more clearly, the embodiments of the invention will be described in detail below in conjunction with the accompanying drawings.

First Embodiment

Figure 1:
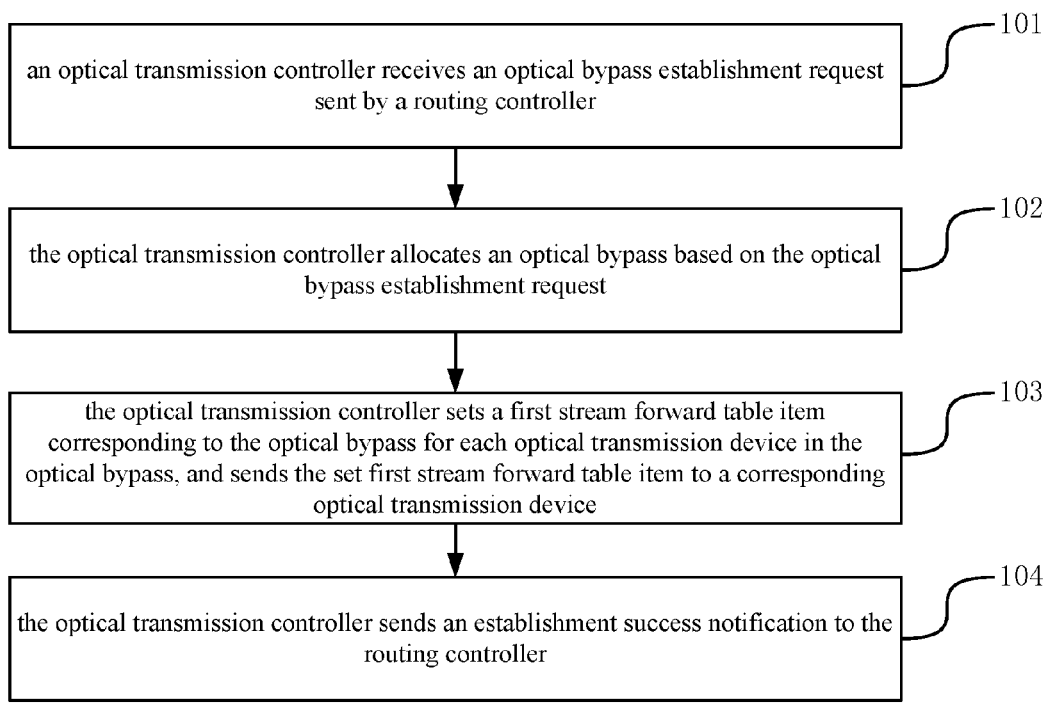
FIG. 1 is a flowchart of a method for establishing an optical bypass provided by an embodiment.

A method for establishing an optical bypass is provided by the embodiment. In the method, a processing of an optical transmission controller may be as shown in FIG. 1, which includes the following steps 101 to 104.

In step 101, the optical transmission controller receives an optical bypass establishment request sent by a routing controller.

In step 102, the optical transmission controller allocates an optical bypass based on the optical bypass establishment request.

In step 103, the optical transmission controller sets a first stream forward entry corresponding to the optical bypass for each optical transmission device in the optical bypass, and sends the set first stream forward entry to the corresponding optical transmission device.

In step 104, the optical transmission controller sends an establishment success notification to the routing controller.

Figure 2:
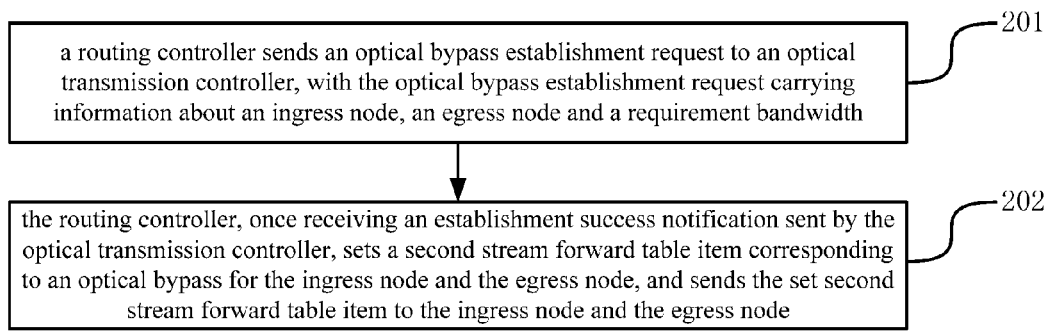
FIG. 2 is a flowchart of a method for establishing an optical bypass provided by an embodiment.

In the method, a processing of a routing controller may be as shown in FIG. 2, which includes the following steps 201 to 202.

In step 201, the routing controller sends an optical bypass establishment request to the optical transmission controller, with the optical bypass establishment request carrying information about an ingress node, an egress node and a required bandwidth.

In step 202, when receiving an establishment success notification sent by the optical transmission controller, the routing controller sets a second stream forward entry corresponding to the optical bypass for the ingress node and the egress node, and sends the set second stream forward entry to the ingress node and the egress node. Specifically, the establishment success notification is configured to indicate that the optical transmission controller has allocated an optical bypass based on the optical bypass establishment request, set a first stream forward entry corresponding to the optical bypass for each optical transmission device in the optical bypass, and sent the set first stream forward entry to a corresponding optical transmission device.

In the embodiment, a routing controller sends an optical bypass establishment request to an optical transmission controller, with the optical bypass establishment request carrying the information about an ingress node, an egress node and a required bandwidth. When receiving an establishment success notification sent by the optical transmission controller, the routing controller sets a second stream forward entry corresponding to the optical bypass for the ingress node and the egress node, and sends the set second stream forward entry to the ingress node and the egress node. The establishment success notification is configured to indicate that the optical transmission controller has allocated an optical bypass based on the optical bypass establishment request, set a first stream forward entry corresponding to the optical bypass for each optical transmission device in the optical bypass, and sent the set first stream forward entry to a corresponding optical transmission device. In this way, in establishing the optical bypass, it does not need to allocate a control channel in a routing link for transmitting the GMPLS UNI message when notifying of the stream forward entries of the optical bypass, thus, utilization of the network resources can be improved.

Second Embodiment

Figure 3:
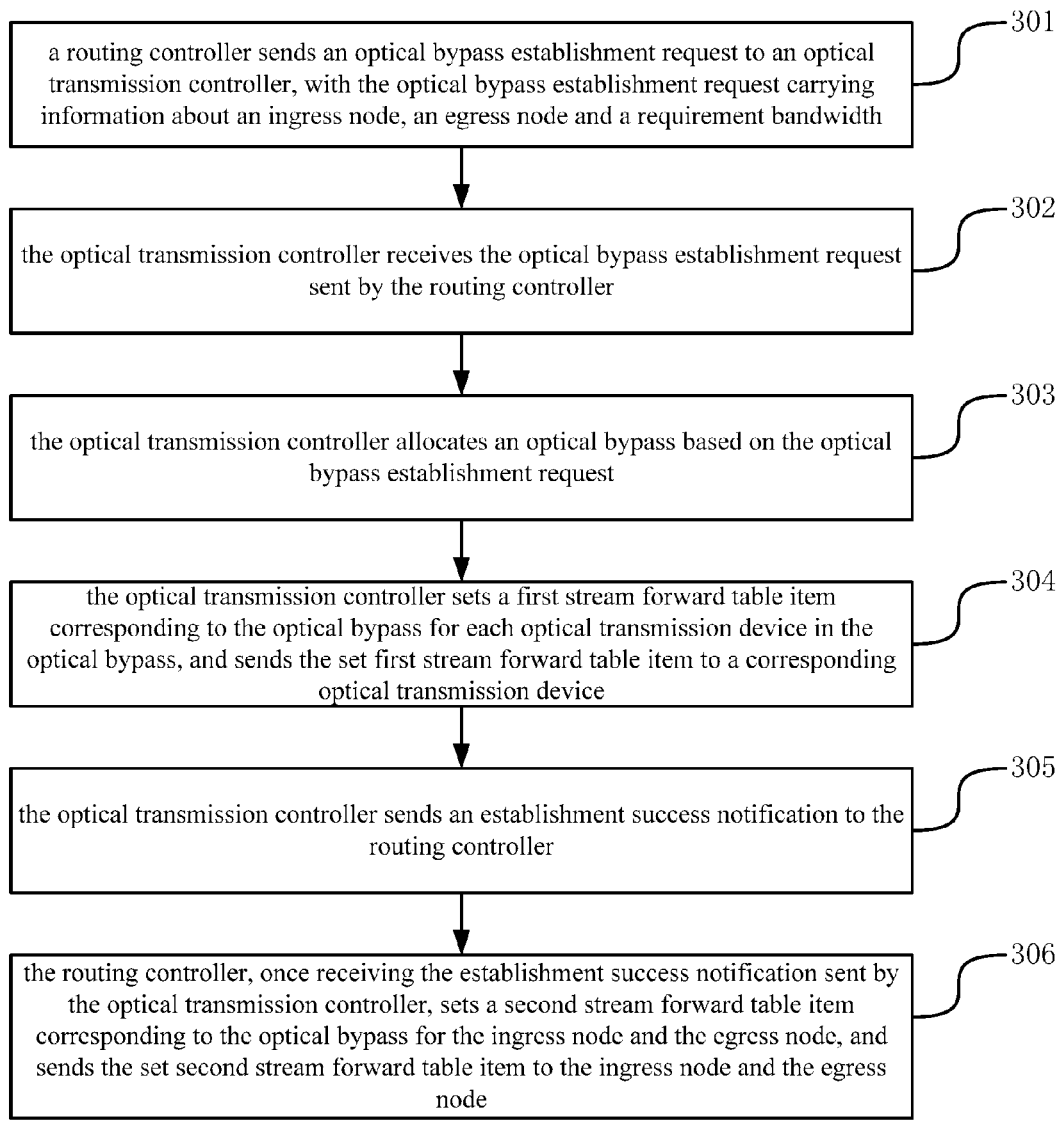
FIG. 3 is a flowchart of a method for establishing an optical bypass provided by an embodiment.

A method for establishing an optical bypass is provided by the embodiment. A processing of the method may be as shown in FIG. 3, which includes the following steps 301 to 306.

In step 301, a routing controller sends an optical bypass establishment request to an optical transmission controller, with the optical bypass establishment request carrying information about an ingress node, an egress node and a required bandwidth.

Before step 301, the ingress node, the egress node and the required bandwidth may be determined by, determining a link in a target LSP for which an optical bypass needs to be established and a required bandwidth based on bandwidth occupation of each link in the target LSP and determining the ingress node and the egress node of the link by the routing controller.

Specifically, each LSP in the network may be a virtual private line allocated for a user or a group of users, and bandwidth may be allocated to the LSP based on a user request. In addition, a threshold of a bandwidth occupation proportion may be set for each LSP according to actual need. For example, the threshold of the bandwidth occupation proportion may be set for the LSP based on a user level and a low threshold may be set for a user with a high level. For example, the threshold for an advanced user is set to be 80%, and the threshold for an ordinary user is set to be 90%. The target LSP is any one of LSPs in the network.

The bandwidth occupation proportion of each link in the target LSP may be acquired when the processing described above is performed. The link whose bandwidth occupation proportion exceeds the threshold of the bandwidth occupation proportion of the LSP is a link in the target LSP for which an optical bypass needs to be established. Therefore, a link whose bandwidth occupation proportion exceeds the threshold of the bandwidth occupation proportion of the target LSP may be acquired from each link included in the target LSP. The ingress node and the egress node are routing devices at two sides of the link respectively. The ingress node of the link is a routing device at the side of the link closing to an ingress of the target LSP, and the egress node of the link is a routing device at the side of the link closing to an egress of the target LSP. The ingress node and the egress node of the link are also an ingress node and an egress node of the optical bypass requested to be established. The required bandwidth is bandwidth of the optical bypass required to be established, and may be determined based on a parameter such as the bandwidth occupation proportion of the link described above and the bandwidth of the target LSP.

Specifically, in step 301, the routing controller may firstly determine an optical transmission device in the optical bypass requested to be established which is connected to the ingress node and determine a port through which the optical transmission device is connected to the ingress node, based on the ingress node and inter-layer link information (information about device connection between an optical transmission layer and a routing transmission layer); and determine an optical transmission device in the optical bypass requested to be established which is connected to the egress node and determine a port through which the optical transmission device is connected to the egress node, based on the egress node and the inter-layer link information. Then, the routing controller may generate an optical bypass establishment request which carries a device identification of the optical transmission device connected to the ingress node, a port identification of the port of the optical transmission device connected to the ingress node, a device identification of the optical transmission device connected to the egress node, a port identification of the port of the optical transmission device connected to the egress node and the required bandwidth. Finally, the routing controller sends the optical bypass establishment request to the optical transmission controller.

In step 302, the optical transmission controller receives the optical bypass establishment request sent by the routing controller.

In step 303, the optical transmission controller allocates an optical bypass based on the optical bypass establishment request.

Specifically, the optical transmission controller may calculate an optical transmission link between the ingress node and the egress node satisfying the required bandwidth, as the optical bypass, based on intra-layer link information (network topology information includes intra-layer link information and inter-layer link information) of the optical transmission layer, remaining bandwidth of each link in the optical transmission layer and information in the optical bypass establishment request.

In step 304, the optical transmission controller sets a first stream forward entry corresponding to the optical bypass for each optical transmission device in the optical bypass, and sends the set first stream forward entry to a corresponding optical transmission device.

Specifically, a stream forward table is generally used to forward a message in the LSP. The stream forward entry may include a matching entry and an action entry. The matching entry is used to match a parameter of the message, and the action entry is used to forward the message. For a received message, a related parameter of the message may be compared with a parameter value in the matching entry. If the related parameter of the message is matched with the parameter value in the matching entry, the message is forwarded based on related information (for example, an egress port) in the action entry.

In the embodiment, in the first stream forward entry corresponding to the optical bypass set for each optical transmission device in the optical bypass, the matching entry may include at least an ingress port entry. The matching entry may further include, for example, a Virtual Local Area Network (VLAN) entry. An example of a stream forward entry of an optical transmission device is given in Table 1 below,

TABLE 1

| Ingress port | VLAN | Ethernet | | | | IP | | ... |
|---|---|---|---|---|---|---|---|---|
| Int3 | 1 | NULL | NULL | NULL | NULL | NULL | NULL | ... | where "NULL" represents that the matching entry is empty, that is, no matching is required; Int3 is a port identification of an ingress port; and 1 is a VLAN identification. A corresponding action entry may be as shown in Table 2 below.

TABLE 2

| Egress port | ... |
|---|---|
| Int2 | ... |

In an implementation, the optical transmission controller sets the first stream forward entry corresponding to the optical bypass for each optical transmission device in the optical bypass may includes: the optical transmission controller sets a matching entry of the first stream forward entry corresponding to the optical bypass for the optical transmission device in the optical bypass based on a port through which the optical transmission device in the optical bypass is connected to a last hop device of the optical transmission device in the optical bypass, and sets an action entry of the first stream forward entry corresponding to the optical bypass for the optical transmission device in the optical bypass based on a port through which the optical transmission device in the optical bypass is connected to a next hop device of the optical transmission device in the optical bypass.

Specifically, the parameter value of the ingress port entry in the matching entry of the first stream forward entry of the optical transmission device may be set as a port identification of the port through which the optical transmission device is connected to the last hop device of the optical transmission device in the optical bypass, and the parameter value of the egress port entry in the action entry of the first stream forward entry of the optical transmission device may be set as a port identification of the port through which the optical transmission device is connected to the next hop device of the optical transmission device in the optical bypass.

In step 305, the optical transmission controller sends an establishment success notification to the routing controller. The execution sequence of steps 305-306 and step 304 is not limited herein. The optical transmission controller may send the establishment success notification to the routing controller after the optical bypass is allocated.

In step 306, the routing controller, once receiving the establishment success notification sent by the optical transmission controller, sets a second stream forward entry corresponding to the optical bypass for the ingress node and the egress node, and sends the set second stream forward entry to the ingress node and the egress node. Specifically, the establishment success notification is configured to indicate that the optical transmission controller has allocated an optical bypass based on the optical bypass establishment request, set a first stream forward entry corresponding to the optical bypass for each optical transmission device in the optical bypass, and sent the set first stream forward entry to a corresponding optical transmission device.

Specifically, the ingress node and the egress node are routing devices. The stream forward entry of the routing device has a similar format to the stream forward entry of the optical transmission device described above.

In the embodiment, in the second stream forward entry corresponding to the optical bypass set for the ingress node and the egress node, the matching entry may include at least an ingress port entry, a source address entry and a destination address entry, and the action entry may include at least an egress port entry. An example of the stream forward entry of the routing device is given in Table 3 below,

TABLE 3

Figure 4:
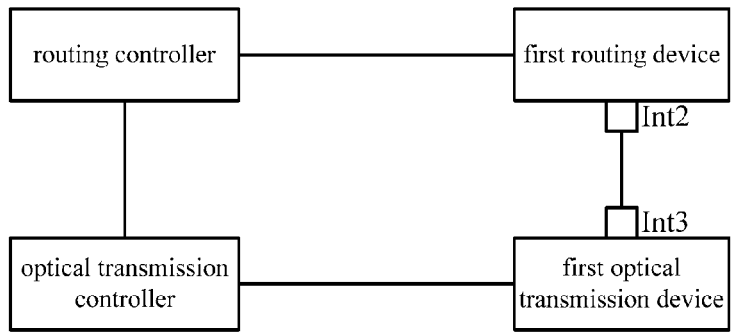
FIG. 4 is a schematic diagram of a network architecture provided by an embodiment.

| Ingress port | VLAN | Ethernet | | | | IP | | ... |
|---|---|---|---|---|---|---|---|---|
| Int5 | NULL | NULL | NULL | NULL | 192.168.15.26 | 192.168.23.6 | IP | ... | where Int5 is a port identification of the ingress port, 192.168.15.26 is a source address, and 192.168.23.6 is a destination address. A corresponding action entry may be as shown in FIG. 4 below.

TABLE 4

| Egress port | ... |
|---|---|
| Int4 | ... |

In an implementation, the routing controller setting the second stream forward entry corresponding to the optical bypass for the ingress node and the egress node may be as follows.

The routing controller may set a matching entry of the second stream forward entry corresponding to the optical bypass for the ingress node based on a matching entry of an existing stream forward entry of a target LSP in the ingress node, and set an action entry of the second stream forward entry corresponding to the optical bypass for the ingress node based on a port through which the ingress node is connected to the optical transmission device in the optical bypass.

Specifically, in the routing device of the ingress node, the existing stream forward entry of the target LSP is a stream forward entry used to forward a message in the routing transmission layer. Two stream forward entries corresponding to the target LSP are stored in the ingress node after the second stream forward entry corresponding to the optical bypass is set for the ingress node. The two stream forward entries correspond to two branches of the target LSP respectively, one branch is an original link of the routing transmission layer between the ingress node and the egress node in the target LSP, and the other branch is an optical bypass established newly in the target LSP.

Specifically, in the ingress node, each of parameter values of the matching entries of the stream forward entries corresponding to the two branches of the target LSP may be the same, that is, the parameter value of the matching entry of the second stream forward entry of the ingress node corresponding the optical bypass may be set to be the same as that of the matching entry of the existing stream forward entry of the target LSP in the ingress node. In forwarding a message of the target LSP, if multiple stream forward entries are matched by the routing device, one stream forward entry may be selected from the multiple stream forward entries based on a predetermined load balancing principle, and the message is forwarded based on the action entry of the selected stream forward entry.

Specifically, the parameter value of the egress port entry in the action entry of the second stream forward entry corresponding to the optical bypass for the ingress node may be set as a port identification of a port through which the ingress node is connected to the optical transmission device in the optical bypass.

The routing controller may set a matching entry of the second stream forward entry corresponding to the optical bypass for the egress node based on a matching entry of an existing stream forward entry of a target LSP in the egress node and a port through which the egress node is connected to the optical transmission device in the optical bypass, and set an action entry of the second stream forward entry corresponding to the optical bypass for the egress node based on an action entry of the existing stream forward entry of the target LSP in the egress node.

Specifically, in the routing device of the egress node, the existing stream forward entry of the target LSP is a stream forward entry used to forward a message in the routing transmission layer. Two stream forward entries corresponding to the target LSP are stored in the egress node after the second stream forward entry corresponding to the optical bypass is set for the egress node. The two stream forward entries correspond to two branches of the target LSP respectively, one branch is an original link of the routing transmission layer between the ingress node and the egress node in the target LSP, and the other branch is an optical bypass established newly in the target LSP.

Specifically, in setting the matching entry of the second stream forward entry corresponding to the optical bypass for the egress node, the parameter value of the ingress port entry may be set as a port identification of a port through which the egress node is connected to the optical transmission device in the optical bypass, and the parameter value of the matching entry (such as a source address entry, a destination address entry) other than the ingress port entry may be set to be the same as that of the matching entry of the existing stream forward entry of the target LSP in the egress node.

Specifically, in setting the action entry of the second stream forward entry corresponding to the optical bypass for the egress node, the parameter value (a port identification) of the egress port entry in the action entry may be set to be the same as that of the action entry of the existing stream forward entry of the target LSP in the egress node.

A method for discovering an inter-layer link is further provided according to an embodiment, which is performed before the process of requesting establishing an optical bypass described above. Network topology information may include intra-layer link information and inter-layer link information, therefore, the inter-layer link discovery may be considered as a part of network topology discovery.

In the method for discovering the inter-layer link, the routing controller may trigger a discovery process for an inter-layer link between the routing transmission layer and the optical transmission layer to make the optical transmission controller acquire the inter-layer link information, and receive the inter-layer link information sent by the optical transmission controller. The specific processing may be as follows.

Firstly, the routing controller sends a first message to a first routing device under jurisdiction of the routing controller based on device information of the first routing device, with the first message carrying a first port identification of a first port of the first routing device and a first device identification of the first routing device; so that the first routing device sends a second message through the first port, with the second message carrying the first port identification and the first device identification; so that a first optical transmission device receiving the second message sends a third message to the optical transmission controller, with the third message carrying a second port identification of a second port through which the first optical transmission device receives the second message, a second device identification of the first optical transmission device, the first port identification and the first device identification; so that the optical transmission controller stores an inter-layer link correspondence among the first device identification, the first port identification, the second device identification and the second port identification, and sends a fourth message to the routing controller, with the fourth message carrying the first device identification, the first port identification, the second device identification and the second port identification.

Then, the routing controller receives the fourth message sent by the optical transmission controller.

Finally, the inter-layer link correspondence among the first device identification, the first port identification, the second device identification and the second port identification is stored by the routing controller.

In the method for discovering the inter-layer link, at the side of the optical transmission controller, the optical transmission controller acquires the inter-layer link information by the discovery process for the inter-layer link between the routing transmission layer and the optical transmission layer that is triggered by the routing controller, and sends the inter-layer link information to the routing controller. The specific processing may be as follows.

Firstly, the optical transmission controller receives a third message sent by a first optical transmission device under jurisdiction of the optical transmission controller. The third message is sent to the optical transmission controller by the first optical transmission device receiving a second message after the routing controller sends a first message to a first routing device under jurisdiction of the routing controller based on device information of the first routing device to make the first routing device sends the second message through a first port, where the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification.

Then, the optical transmission controller stores an inter-layer link correspondence among the first device identification, the first port identification, the second device identification and the second port identification, and sends a fourth message to the routing controller, so that the inter-layer link correspondence among the first device identification, the first port identification, the second device identification and the second port identification is stored by the routing controller, where the fourth message carries the first device identification, the first port identification, the second device identification and the second port identification.

Figure 5:
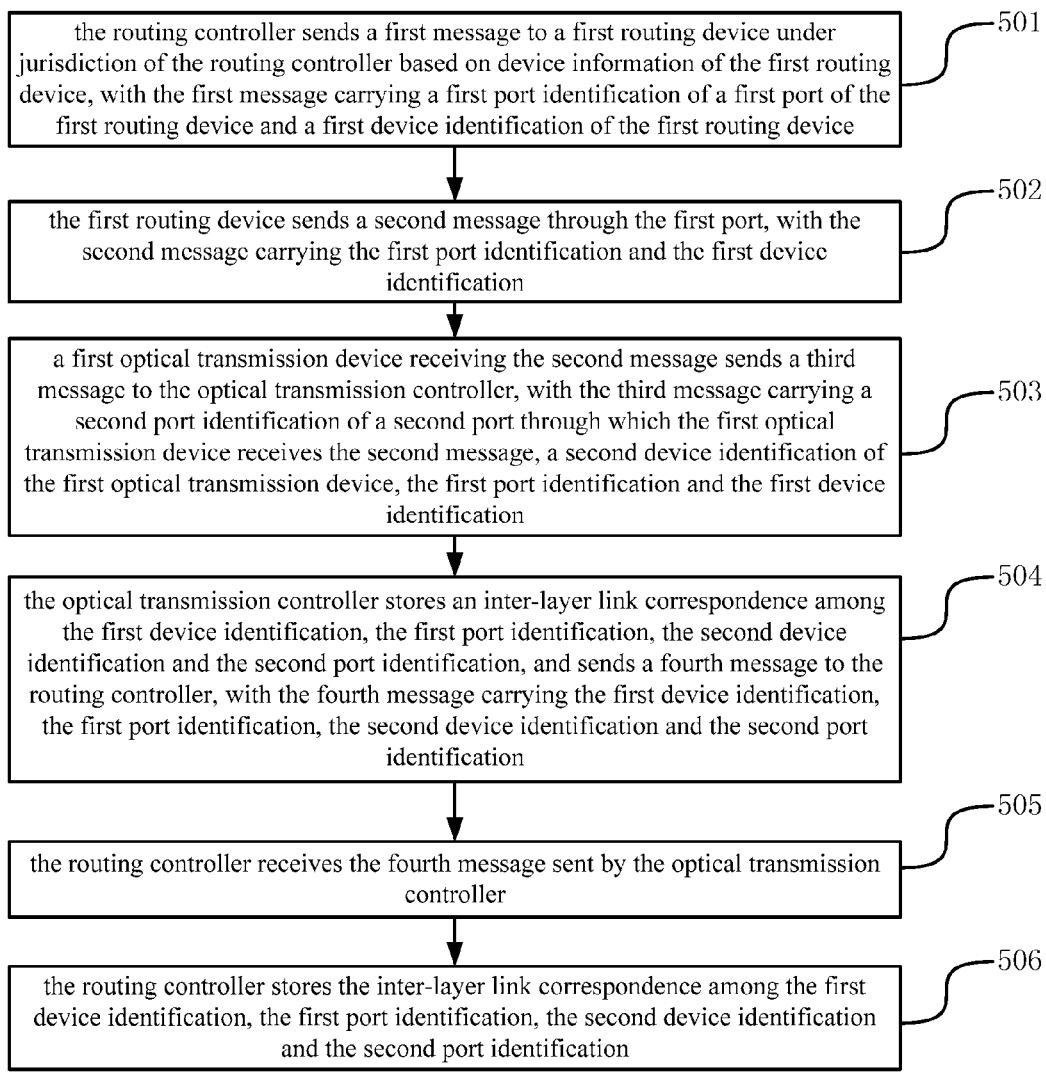
FIG. 5 is a flowchart of a discovery process for an inter-layer link provided by an embodiment.

The method for discovering the inter-layer link described above is illustrated in detail below in conjunction with a specific processing. FIG. 4 is a schematic diagram of a network architecture (FIG. 4 is a simplified network architecture for illustration, which only include devices involved in the processing described below, and other devices in the network are not shown). As shown in FIG. 5, the processing may include the following steps 501 to 506.

In step 501, the routing controller sends a first message to a first routing device under jurisdiction of the routing controller based on device information of the first routing device, with the first message carrying a first port identification (Int2 as shown in FIG. 4) of a first port of the first routing device and a first device identification of the first routing device.

Before step 501, the routing controller may acquire device information of a routing device under jurisdiction of the routing controller, and the device information may include information such as a device identification of the routing device and a port identification of each port of the routing device. Accordingly, the optical transmission controller may also acquire device information of an optical transmission device under jurisdiction of the optical transmission controller.

Specifically, the first routing device is any of routing devices under jurisdiction of the routing controller, and the first port may be any of ports on the first routing device. The routing controller may set a first message for each port of each routing device under jurisdiction of the routing controller, and send the first message to the corresponding routing device.

Preferably, the processing in step 501 may be implemented based on an Openflow protocol and a link discovery protocol. The first message may be a packet_out message, and the first port identification may be carried in action_list in the message. A link discovery protocol message may be packaged in a payload of the packet_out, and the first port identification and the first device identification may be carried in the link discovery protocol message.

In step 502, the first routing device sends a second message through the first port, with the second message carrying the first port identification and the first device identification.

Preferably, the first routing device may analyze the packet_out message described above, acquire the link discovery protocol message in the packet_out message, and send the link discovery protocol message as the second message through the first port.

In step 503, the first optical transmission device receiving the second message sends a third message to the optical transmission controller, with the third message carrying a second port identification (Int3 as shown in FIG. 4) of a second port through which the first optical transmission device receives the second message, a second device identification of the first optical transmission device, the first port identification and the first device identification.

Specifically, the first optical transmission device is any of optical transmission devices under jurisdiction of the optical transmission controller, and the second port may be any of ports on the first optical transmission device.

Preferably, the first optical transmission device may support the Openflow protocol, and may not support the link discovery protocol. Therefore, the first optical transmission device, once receiving the link discovery protocol message described above, can not analyze and forward the link discovery protocol message. The first optical transmission device packages the link discovery protocol message in the packet_in message based on the Openflow protocol, and sends the packet_in message to the optical transmission controller. The packet_in message may also carry the second device identification and the second port identification.

In step 504, the optical transmission controller stores an inter-layer link correspondence among the first device identification, the first port identification, the second device identification and the second port identification, and sends a fourth message to the routing controller, with the fourth message carrying the first device identification, the first port identification, the second device identification and the second port identification.

Preferably, a link table may be established in the optical transmission controller, and the link table may include entries of the inter-layer link. The first device identification, the first port identification, the second device identification and the second port identification are stored in the link table, and in this way, a case that the inter-layer link exists between the first port of the first routing device and the second port of the first optical transmission device may be recorded.

Preferably, the optical transmission controller may support the Openflow protocol and the link discovery protocol. The optical transmission controller, once receiving the packet_in message, may analyze the packet_in message to acquire the link discovery protocol message, the second device identification and the second port identification therein, and further analyze the link discovery protocol message to acquire the first port identification and the first device identification therein. Then, a case that an inter-layer link is provided between the first port of the first routing device and the second port of the first optical transmission device may be recorded by the optical transmission controller.

The optical transmission controller may determine a routing controller corresponding to the first device identification based on a pre-recorded correspondence between a routing controller and a routing device under jurisdiction of the routing controller, and take the determined routing controller as a destination terminal to which a fourth message is sent. Alternatively, information of the routing controller may be carried in the link discovery protocol message described above, and the optical transmission controller may determine the corresponding routing controller based on the information of the routing controller, and take the determined routing controller as a destination terminal to which the fourth message is sent.

In step 505, the routing controller receives the fourth message sent by the optical transmission controller.

In step 506, the routing controller stores the inter-layer link correspondence among the first device identification, the first port identification, the second device identification and the second port identification.

Preferably, a link table may be established in the routing controller, and the link table may include entries of the inter-layer link. The first device identification, the first port identification, the second device identification and the second port identification are stored in the link table, and in this way, a case that the inter-layer link exists between the first port of the first routing device and the second port of the first optical transmission device may be recorded.

The following processing may be performed after step 506.

Firstly, the routing controller may set configuration information for the first port of the first routing device and the second port of the first optical transmission device based on the inter-layer link correspondence among the first device identification, the first port identification, the second device identification and the second port identification, the configuration information may include, for example, an Internet Protocol (IP) address. Preferably, IP addresses in the same network segment may be set for ports connected to each other. That is, IP addresses in the same network segment are set for the first port of the first routing device and the second port of the first optical transmission device. For example, an IP address of the Int2 described above may be set to be 192.168.10.24, mask: 255.255.255.0, and an IP address of the Int3 may be set to be 192.168.10.25, mask: 255.255.255.0.

Then, the routing controller sends the configuration information to the optical transmission controller, and the routing controller and the optical transmission controller send the configuration information to the first routing device and the first optical transmission device respectively. Alternatively, the routing controller and the optical transmission controller may send the configuration information to their configuration server(s) (the routing controller and the optical transmission controller may have respective configuration servers, or may share one configuration server), and then the configuration server(s) sends the configuration information to the first routing device and the first optical transmission device.

In the embodiment, a discovery process for an intra-layer link and a discovery process for an inter-layer link may be performed simultaneously. During step 501 and step 502 described above, the routing controller may set a first message for each port of each routing device under jurisdiction of the routing controller, and send the first message to the corresponding routing device, the port connected to the optical transmission device and the port connected to the routing device may not be distinguished herein. The routing device, once receiving the second message, may analyze the link discovery protocol message in the packet_out, and then feed back related information to the routing controller based on a normal intra-layer link discovery process, and the intra-layer link is recorded by the routing controller.

In the embodiment, a processing for establishing a connection relationship between controllers (the controller may be the routing controller, or may be the optical transmission controller) may be performed before the network topology discovery. The specific processing may be, a target controller (the target controller may be any controller) stores connection information of other controllers. The connection information may be an IP address, and the target controller may store the IP addresses and device identifications of the other controllers correspondingly. There are multiple ways for the target controller to store the connection information of the other controllers, and some preferable ways are given below.

In a first way, the IP addresses and the device identifications of the other controllers which needs to establish a connection relationship with the target controller are stored directly in the target controller in a direct configuration way.

In a second way, the target controller broadcasts its IP address and device identification (for example, by an Open Shortest Path First (OSPF) protocol), and other controller receiving the broadcast message feeds back its device identification and IP address to the target controller, then the target controller stores the received device identification and IP address of the other controller correspondingly.

In a third way, the target controller sends an extended link discovery protocol message to other controller connected directly to the target controller, and the link discovery protocol message carries a device identification and an IP address of the target controller. The other controller receiving the link discovery protocol message feeds back its device identification and IP address to the target controller. Then the target controller stores the received device identification and IP address of the other controller correspondingly. In this way, only the connection relationship between the target controller and the other controller connected directly to the target controller may be established.

In the embodiment, the routing controller sends an optical bypass establishment request to the optical transmission controller, with the optical bypass establishment request carrying information about an ingress node, an egress node and a required bandwidth. The routing controller, once receiving an establishment success notification sent by the optical transmission controller, sets a second stream forward entry corresponding to the optical bypass for the ingress node and the egress node, and sends the set second stream forward entry to the ingress node and the egress node. The establishment success notification is configured to indicate that the optical transmission controller has allocated an optical bypass based on the optical bypass establishment request, set a first stream forward entry corresponding to the optical bypass for each optical transmission device in the optical bypass, and sent the set first stream forward entry to the corresponding optical transmission device. In this way, in establishing the optical bypass, it does not need to allocate a control channel in the routing link for transmitting the GMPLS UNI message when notifying of the stream forward entries of the optical bypass, thus, utilization of the network resources can be improved.

Third Embodiment

Figure 6:
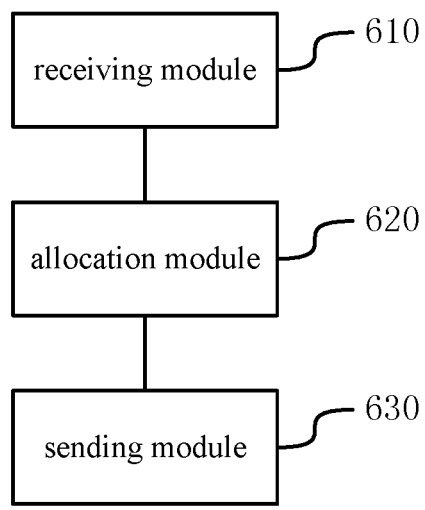
FIG. 6 is a schematic structural diagram of an optical transmission controller provided by an embodiment.

Based on the same technical concept, an optical transmission controller is further provided by an embodiment. As shown in FIG. 6, the optical transmission controller includes:

a receiving module 610 configured to receive an optical bypass establishment request sent by a routing controller;

an allocation module 620 configured to allocate an optical bypass based on the optical bypass establishment request; and a sending module 630 configured to set a first stream forward entry corresponding to the optical bypass for each optical transmission device in the optical bypass, and send the set first stream forward entry to the corresponding optical transmission device; and send an establishment success notification to the routing controller.

Preferably, the sending module 630 is configured to:

set a matching entry of the first stream forward entry corresponding to the optical bypass for an optical transmission device in the optical bypass based on a port through which the optical transmission device in the optical bypass is connected to a last hop device of the optical transmission device in the optical bypass, and set an action entry of the first stream forward entry corresponding to the optical bypass for the optical transmission device in the optical bypass based on a port through which the optical transmission device in the optical bypass is connected to a next hop device of the optical transmission device in the optical bypass.

Preferably, the optical transmission controller further includes a discovery module configured to:

acquire inter-layer link information by a discovery process for an inter-layer link between a routing transmission layer and an optical transmission layer that is triggered by the routing controller, and send the inter-layer link information to the routing controller, before the optical bypass establishment request sent by the routing controller is received.

Preferably, the discovery module is configured to:

receive a third message sent by a first optical transmission device under jurisdiction of the optical transmission controller, where the third message is sent to the optical transmission controller by the first optical transmission device receiving a second message after the routing controller sends a first message to a first routing device under jurisdiction of the routing controller based on device information of the first routing device to make the first routing device sends the second message through a first port, where the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification; and store an inter-layer link correspondence among the first device identification, the first port identification, the second device identification and the second port identification, and send a fourth message to the routing controller, where the fourth message carries the first device identification, the first port identification, the second device identification and the second port identification; so that the routing controller stores the inter-layer link correspondence among the first device identification, the first port identification, the second device identification and the second port identification.

In the embodiment, the optical transmission controller receives an optical bypass establishment request sent by the routing controller, allocates the optical bypass based on the optical bypass establishment request, sets a stream forward entry corresponding to the optical bypass for each optical transmission device in the optical bypass, sends the set stream forward entry to the corresponding optical transmission device, and sends an establishment success notification to the routing controller, so that the routing controller sets a stream forward entry corresponding to the optical bypass for the ingress node and the egress node of the optical bypass, and sends the set stream forward entry to the ingress node and the egress node. In this way, in establishing the optical bypass, it does not need to allocate a control channel in a routing link for transmitting the GMPLS UNI message when notifying of the stream forward entry of the optical bypass, thus, utilization of the network resources can be improved.

Fourth Embodiment

Figure 7:
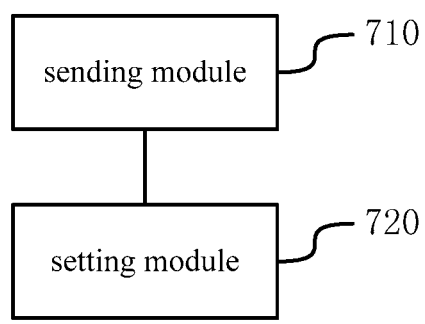
FIG. 7 is a schematic structural diagram of a routing controller provided by an embodiment.

Based on the same technical concept, a routing controller is provided by an embodiment. As shown in FIG. 7, the routing controller includes:

a sending module 701 configured to send an optical bypass establishment request to an optical transmission controller, where the optical bypass establishment request carries information about an ingress node, an egress node and a required bandwidth; and a setting module 720 configured to, when an establishment success notification sent by the optical transmission controller is received, set a second stream forward entry corresponding to an optical bypass for the ingress node and the egress node, and send the set second stream forward entry to the ingress node and the egress node, where the establishment success notification is configured to indicate that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device.

Preferably, the setting module 720 is configured to:

set a matching entry of the second stream forward entry corresponding to the optical bypass for the ingress node based on a matching entry of an existing stream forward entry of a target LSP in the ingress node, and set an action entry of the second stream forward entry corresponding to the optical bypass for the ingress node based on a port through which the ingress node is connected to the optical transmission device in the optical bypass; and set a matching entry of the second stream forward entry corresponding to the optical bypass for the egress node based on a matching entry of an existing stream forward entry of the target LSP in the egress node and a port through which the egress node is connected to the optical transmission device in the optical bypass, and set an action entry of the second stream forward entry corresponding to the optical bypass for the egress node based on an action entry of the existing stream forward entry of the target LSP in the egress node.

Preferably, the routing controller further includes:

a determining module, which is configured to determine a link in a target LSP for which an optical bypass needs to be established and the required bandwidth based on bandwidth occupation of each link in the target LSP, and determine the ingress node and the egress node of the link, before the optical bypass establishment request is sent to the optical transmission controller.

Preferably, the routing controller further includes a discovery module, which is configured to trigger a discovery process for an inter-layer link between a routing transmission layer and an optical transmission layer to make the optical transmission controller acquire inter-layer link information, and receive the inter-layer link information sent by the optical transmission controller, before the optical bypass establishment request is sent to the optical transmission controller.

Preferably, the discovery module is configured to send a first message to a first routing device under jurisdiction of the routing controller based on device information of the first routing device, where the first message carries a first port identification of a first port of the first routing device and a first device identification of the first routing device; so that the first routing device sends a second message through the first port, where the second message carries the first port identification and the first device identification; so that a first optical transmission device receiving the second message sends a third message to the optical transmission, where the third message carries a second port identification of a second port through which the first optical transmission device receives the second message, a second device identification of the first optical transmission device, the first port identification and the first device identification; so that the optical transmission controller stores an inter-layer link correspondence among the first device identification, the first port identification, the second device identification and the second port identification, and sends a fourth message to the routing controller, where the fourth message carries the first device identification, the first port identification, the second device identification and the second port identification;

receive the fourth message sent by the optical transmission controller; and store the inter-layer link correspondence among the first device identification, the first port identification, the second device identification and the second port identification.

In the embodiment, the routing controller sends an optical bypass establishment request to the optical transmission controller, with the optical bypass establishment request carrying information about an ingress node, an egress node and a required bandwidth. When receiving an establishment success notification sent by the optical transmission controller, the routing controller sets a second stream forward entry corresponding to the optical bypass for the ingress node and the egress node, and sends the set second stream forward entry to the ingress node and the egress node. The establishment success notification is configured to indicate that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device. In this way, in establishing the optical bypass, it does not need to allocate a control channel in a routing link for transmitting the GMPLS UNI message when notifying of the stream forward entry of the optical bypass, thus, utilization of the network resources can be improved.

Fifth Embodiment

Based on the same technical concept, a system for establishing an optical bypass is provided by an embodiment. The system includes a routing controller, an optical transmission controller, a routing device and an optical transmission device.

The routing controller is configured to send an optical bypass establishment request to the optical transmission controller, where the optical bypass establishment request carries information about an ingress node, an egress node and a required bandwidth; and when receiving an establishment success notification sent by the optical transmission controller, set a second stream forward entry corresponding to the optical bypass for the ingress node and the egress node, and send the set second stream forward entry to the ingress node and the egress node.

The optical transmission controller is configured to receive the optical bypass establishment request sent by the routing controller; allocate the optical bypass based on the optical bypass establishment request; set a first stream forward entry corresponding to the optical bypass for each optical transmission device in the optical bypass, and send the set first stream forward entry to the corresponding optical transmission device; and send the establishment success notification to the routing controller.

In the embodiment, the routing controller sends an optical bypass establishment request to the optical transmission controller, with the optical bypass establishment request carrying information about an ingress node, an egress node and a required bandwidth. When receiving an establishment success notification sent by the optical transmission controller, the routing controller sets a second stream forward entry corresponding to the optical bypass for the ingress node and the egress node, and sends the set second stream forward entry to the ingress node and the egress node. The establishment success notification is configured to indicate that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device. In this way, in establishing the optical bypass, it does not need to allocate a control channel in a routing link for transmitting the GMPLS UNI message when notifying of the stream forward entry of the optical bypass, thus, utilization of the network resources can be improved.

It can be understood by those skilled in the art that all or part of steps for implementing the embodiments described above may be realized by hardware, or may be realized by the related hardware instructed by a program. The program may be stored in a computer readable storage medium, and the storage medium described above may be a Read Only Memory, a magnetic disk, a compact disk or the like.

Only preferred embodiments are described above, and the disclosure is not limited thereto. All modifications, equivalent substitutions and amendments made within the spirit and principle of the disclosure fall within the scope of protection of the disclosure.

What is claimed is:

1. A method for establishing an optical bypass, applied in a core network architecture comprising an optical transmission layer comprising one or more optical transmission devices and a routing transmission layer comprising one or more routing devices, the method comprising:

sending, by a routing controller, an optical bypass establishment request to an optical transmission controller to enable the optical transmission controller to allocate an optical bypass based on the optical bypass establishment request, to set a first stream forward entry corresponding to the optical bypass for each optical transmission device in the optical bypass, to send the set first stream forward entry to the corresponding optical transmission device, and to send an establishment success notification to the routing controller, wherein the optical bypass establishment request carries information about an ingress node which is one of the one or more routing devices, information about an egress node which is one of the one or more routing devices, and a required bandwidth, wherein information about the ingress node and information about the egress node comprise a device identification of an optical transmission device connected to the ingress node, a port identification of a port of the optical transmission device connected to the ingress node, a device identification of an optical transmission device connected to the egress node, and a port identification of a port of the optical transmission device connected to the egress node, and wherein the establishment success notification indicates that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device;

receiving, by the routing controller, the establishment success notification sent by the optical transmission controller;

responsive to receiving the establishment success notification sent by the optical transmission controller, setting, by the routing controller, a second stream forward entry corresponding to the optical bypass for the ingress node and the egress node; and sending, by the routing controller, the set second stream forward entry to the ingress node and the egress node.

2. The method according to claim 1, wherein the setting, by the routing controller, the second stream forward entry corresponding to the optical bypass for the ingress node and the egress node comprises:

setting, by the routing controller, a matching entry of the second stream forward entry corresponding to the optical bypass for the ingress node based on a matching entry of an existing stream forward entry of a target label switched path (LSP) in the ingress node, and setting, by the routing controller, an action entry of the second stream forward entry corresponding to the optical bypass for the ingress node based on a port through which the ingress node is connected to the optical transmission device in the optical bypass; and setting, by the routing controller, a matching entry of the second stream forward entry corresponding to the optical bypass for the egress node based on a matching entry of an existing stream forward entry of the target LSP in the egress node and a port through which the egress node is connected to the optical transmission device in the optical bypass, and setting, by the routing controller, an action entry of the second stream forward entry corresponding to the optical bypass for the egress node based on an action entry of the existing stream forward entry of the target LSP in the egress node.

3. The method according to claim 1, wherein before sending the optical bypass establishment request to the optical transmission controller by the routing controller, the method further comprises:

determining, by the routing controller, a link in a target LSP for which an optical bypass needs to be established and the required bandwidth based on a bandwidth occupation of each link in the target LSP; and determining, by the routing controller, the ingress node and the egress node of the link.

4. The method according to claim 1, wherein before sending the optical bypass establishment request to the optical transmission controller by the routing controller, the method further comprises:

triggering, by the routing controller, a discovery process for an inter-layer link between the routing transmission layer and the optical transmission layer to cause the optical transmission controller to acquire inter-layer link information; and receiving, by the routing controller, the inter-layer link information sent by the optical transmission controller.

5. The method according to claim 4, wherein the triggering, by the routing controller, a discovery process for an inter-layer link between the routing transmission layer and the optical transmission layer to cause the optical transmission controller to acquire inter-layer link information, and receiving, by the routing controller, the inter-layer link information sent by the optical transmission controller comprises:

sending, by the routing controller, a first message to a first routing device under jurisdiction of the routing controller based on device information of the first routing device, wherein the first message carries a first port identification of a first port of the first routing device and a first device identification of the first routing device; to enable the first routing device to send a second message through the first port, wherein the second message carries the first port identification and the first device identification; to enable a first optical transmission device receiving the second message to send a third message to the optical transmission controller, wherein the third message carries a second port identification of a second port through which the first optical transmission device receives the second message, a second device identification of the first optical transmission device, the first port identification and the first device identification; and to enable the optical transmission controller to store an inter-layer link correspondence among the first device identification, the first port identification, the second device identification and the second port identification, and to send a fourth message to the routing controller, wherein the fourth message carries the first device identification, the first port identification, the second device identification and the second port identification;

receiving, by the routing controller, the fourth message sent by the optical transmission controller; and storing, by the routing controller, an inter-layer link correspondence among the first device identification, the first port identification, the second device identification and the second port identification.

6. A method for establishing an optical bypass applied in a core network architecture comprising an optical transmission layer comprising one or more optical transmission devices and a routing transmission layer comprising one or more routing devices, the method comprising:

receiving, by an optical transmission controller, an optical bypass establishment request sent by a routing controller, wherein the optical bypass establishment request carries information about an ingress node which is one of the one or more routing devices, information about an egress node which is one of the one or more routing devices, and a required bandwidth, wherein information about the ingress node and information about the egress node comprise a device identification of an optical transmission device connected to the ingress node, a port identification of a port of the optical transmission device connected to the ingress node, a device identification of an optical transmission device connected to the egress node, and a port identification of a port of the optical transmission device connected to the egress node;

allocating, by the optical transmission controller, an optical bypass based on the optical bypass establishment request; and setting, by the optical transmission controller, a first stream forward entry corresponding to the optical bypass for each optical transmission device in the optical bypass and sending the set first stream forward entry to the corresponding optical transmission device; and sending, by the optical transmission controller, an establishment success notification to the routing controller, to enable the routing controller to set a second stream forward entry corresponding to the optical bypass for the ingress node and the egress node and to send the set second stream forward entry to the ingress node and the egress node, wherein the establishment success notification indicates that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device.

7. The method according to claim 6, wherein the setting, by the optical transmission controller, the first stream forward entry corresponding to the optical bypass for each optical transmission device in the optical bypass comprises:
setting, by the optical transmission controller, a matching entry of the first stream forward entry corresponding to the optical bypass for an optical transmission device in the optical bypass based on a port through which the optical transmission device in the optical bypass is connected to a last hop device of the optical transmission device in the optical bypass, and setting, by the optical transmission controller, an action entry of the first stream forward entry corresponding to the optical bypass for the optical transmission device in the optical bypass based on a port through which the optical transmission device in the optical bypass is connected to a next hop device of the optical transmission device in the optical bypass.

8. The method according to claim 6, wherein before receiving, by the optical transmission controller, the optical bypass establishment request sent by the routing controller, the method further comprises:
acquiring, by the optical transmission controller, inter-layer link information by a discovery process for an inter-layer link between the routing transmission layer and the optical transmission layer that is triggered by the routing controller; and sending, by the optical transmission controller, the inter-layer link information to the routing controller.

9. The method according to claim 8, wherein the acquiring, by the optical transmission controller, inter-layer link information by a discovery process for an inter-layer link between the routing transmission layer and the optical transmission layer that is triggered by the routing controller, and sending, by the optical transmission controller, the inter-layer link information to the routing controller comprises:
receiving, by the optical transmission controller, a third message sent by a first optical transmission device under jurisdiction of the optical transmission controller, wherein the third message is sent to the optical transmission controller by the first optical transmission device receiving a second message after the routing controller sends a first message to a first routing device under jurisdiction of the routing controller based on device information of the first routing device to cause the first routing device to send the second message through a first port, wherein the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification; and
storing, by the optical transmission controller, an inter-layer link correspondence among the first device identification, the first port identification, the second device identification and the second port identification, and sending, by the optical transmission controller, a fourth message to the routing controller, wherein the fourth message carries the first device identification, the first port identification, the second device identification and the second port identification; to enable the routing controller to store the inter-layer link correspondence among the first device identification, the first port identification, the second device identification and the second port identification.

10. A routing controller, located within a core network architecture comprising an optical transmission layer comprising one or more optical transmission devices and a routing transmission layer comprising one or more routing devices, wherein the routing controller comprises a processor and a transceiver,
wherein the transceiver is configured to send an optical bypass establishment request to an optical transmission controller to enable the optical transmission controller to allocate an optical bypass based on the optical bypass establishment request, to set a first stream forward entry corresponding to the optical bypass for each optical transmission device in the optical bypass, to send the set first stream forward entry to the corresponding optical transmission device, and to send an establishment success notification to the routing controller, wherein the optical bypass establishment request carries information about an ingress node which is one of the one or more routing devices information about an egress node which is one of the one or more routing devices, and a required bandwidth, wherein information about the ingress node and information about the egress node comprise a device identification of an optical transmission device connected to the ingress node, a port identification of a port of the optical transmission device connected to the ingress node, a device identification of an optical transmission device connected to the egress node, and a port identification of a port of the optical transmission device connected to the egress node, and wherein the establishment success notification indicates that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device;
wherein the transceiver is further configured to receive the establishment success notification sent by the optical transmission controller; and
wherein the process is configured to, when an establishment success notification sent by the optical transmission controller is received, set a second stream forward entry corresponding to an optical bypass for the ingress node and the egress node, and send the set second stream forward entry to the ingress node and the egress node.

11. The routing controller according to claim 10, wherein the processor is configured to:
set a matching entry of the second stream forward entry corresponding to the optical bypass for the ingress node based on a matching entry of an existing stream forward entry of a target label switched path (LSP) in the ingress node, and set an action entry of the second stream forward entry corresponding to the optical bypass for the ingress node based on a port through which the ingress node is connected to the optical transmission device in the optical bypass; and
set a matching entry of the second stream forward entry corresponding to the optical bypass for the egress node based on a matching entry of an existing stream forward entry of the target LSP in the egress node and a port through which the egress node is connected to the optical transmission device in the optical bypass, and set an action entry of the second stream forward entry corresponding to the optical bypass for the egress node based on an action entry of the existing stream forward entry of the target LSP in the egress node.

12. The routing controller according to claim 10, wherein the processor is further configured to:
determine a link in a target LSP for which an optical bypass needs to be established and the required bandwidth based on a bandwidth occupation of each link in the target LSP, and determine the ingress node and the egress node of the link, before the optical bypass establishment request is sent to the optical transmission controller.

13. The routing controller according to claim 10, wherein the processor is further configured to:
trigger a discovery process for an inter-layer link between the routing transmission layer and the optical transmission layer to cause the optical transmission controller to acquire inter-layer link information, and receive the inter-layer link information sent by the optical transmission controller, before the optical bypass establishment request is sent to the optical transmission controller.

14. The routing controller according to claim 13, wherein the processor is configured to:
send a first message to a first routing device under jurisdiction of the routing controller based on device information of the first routing device, wherein the first message carries a first port identification of a first port of the first routing device and a first device identification of the first routing device; to enable the first routing device to send a second message through the first port, wherein the second message carries the first port identification and the first device identification; to enable a first optical transmission device receiving the second message to send a third message to the optical transmission, wherein the third message carries a second port identification of a second port through which the first optical transmission device receives the second message, a second device identification of the first optical transmission device, the first port identification and the first device identification; to enable the optical transmission controller to store an inter-layer link correspondence among the first device identification, the first port identification, the second device identification and the second port identification, and to send a fourth message to the routing controller, wherein the fourth message carries the first device identification, the first port identification, the second device identification and the second port identification;
receive the fourth message sent by the optical transmission controller; and
store the inter-layer link correspondence among the first device identification, the first port identification, the second device identification and the second port identification.

15. An optical transmission controller located within a core network architecture comprising an optical transmission layer comprising one or more optical transmission devices and a routing transmission layer comprising one or more routing devices, wherein the optical transmission controller comprises a processor and a transceiver,
wherein the transceiver is configured to receive an optical bypass establishment request sent by a routing controller, wherein the optical bypass establishment request carries information about an ingress node which is one of the one or more routing devices, information about an egress node which is one of the one or more routing devices, and a required bandwidth, wherein information about the ingress node and information about the egress node comprise a device identification of an optical transmission device connected to the ingress node, a port identification of a port of the optical transmission device connected to the ingress node, a device identification of an optical transmission device connected to the egress node, and a port identification of a port of the optical transmission device connected to the egress node;
wherein the processor is configured to allocate an optical bypass based on the optical bypass establishment request; and
wherein the transceiver is further configured to set a first stream forward entry corresponding to the optical bypass for each optical transmission device in the optical bypass, and send the set first stream forward entry to a corresponding optical transmission device; and send an establishment success notification to the routing controller to enable the routing controller to set a second stream forward entry corresponding to the optical bypass for the ingress node and the egress node and to send the set second stream forward entry to the ingress node and the egress node, wherein the establishment success notification indicates that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device.

16. The optical transmission controller according to claim 15, wherein the processor is configured to:
set a matching entry of the first stream forward entry corresponding to the optical bypass for an optical transmission device in the optical bypass based on a port through which the optical transmission device in the optical bypass is connected to a last hop device of the optical transmission device in the optical bypass, and set an action entry of the first stream forward entry corresponding to the optical bypass for the optical transmission device in the optical bypass based on a port through which the optical transmission device in the optical bypass is connected to a next hop device of the optical transmission device in the optical bypass.

17. The optical transmission controller according to claim 15, wherein the processor is further configured to:
acquire inter-layer link information by a discovery process for an inter-layer link between the routing transmission layer and the optical transmission layer that is triggered by the routing controller, and send the inter-layer link information to the routing controller, before the optical bypass establishment request sent by the routing controller is received.

18. The optical transmission controller according to claim 17, wherein the processor is configured to:
receive a third message sent by a first optical transmission device under jurisdiction of the optical transmission controller, wherein the third message is sent to the optical transmission controller by the first optical transmission device receiving a second message after the routing controller sends a first message to a first routing device under jurisdiction of the routing controller based on device information of the first routing device to cause the first routing device to send the second message through a first port, wherein the first message carries a first port identification of the first port of the first routing device and a first device identification of the first routing device, the second message carries the first port identification and the first device identification, and the third message carries a second port identification of a second port through which the first optical transmission device receives the second message, a second device identification of the first optical transmission device, the first port identification and the first device identification; and store an inter-layer link correspondence among the first device identification, the first port identification, the second device identification and the second port identification, and send a fourth message to the routing controller, wherein the fourth message carries the first device identification, the first port identification, the second device identification and the second port identification; to enable the routing controller to store the inter-layer link correspondence among the first device identification, the first port identification, the second device identification and the second port identification.

19. A system for establishing an optical bypass, comprising a routing controller, an optical transmission controller, one or more routing devices and one or more optical transmission devices, wherein the routing controller is configured to:

send an optical bypass establishment request to the optical transmission controller, wherein the optical bypass establishment request carries information about an ingress node which is one of the one or more routing devices information about an egress node which is one of the one or more routing devices, and a required bandwidth, and information about the ingress node and information about the egress node comprise a device identification of an optical transmission device connected to the ingress node, a port identification of a port of the optical transmission device connected to the ingress node, a device identification of an optical transmission device connected to the egress node, and a port identification of a port of the optical transmission device connected to the egress node;

receive an establishment success notification sent by the optical transmission controller, wherein the establishment success notification indicates that the optical transmission controller has allocated the optical bypass based on the optical bypass establishment request, set a first stream forward entry corresponding to the optical bypass for each optical transmission device in the optical bypass, and sent the set first stream forward entry to the corresponding optical transmission device; and in response to receiving the establishment success notification sent by the optical transmission controller, set a second stream forward entry corresponding to the optical bypass for the ingress node and the egress node, and send the set second stream forward entry to the ingress node and the egress node; and the optical transmission controller is configured to:

receive the optical bypass establishment request sent by the routing controller;

allocate the optical bypass based on the optical bypass establishment request;

set a first stream forward entry corresponding to the optical bypass for each optical transmission device in the optical bypass, and send the set first stream forward entry to the corresponding optical transmission device; and send the establishment success notification to the routing controller.

* * * * *